United States Patent [19]

Pomella et al.

[11] 3,751,651
[45] Aug. 7, 1973

[54] DIMENSION COMPARATOR FOR MACHINE TOOLS

[75] Inventors: Piero Pomella; Luciano Lauro, both of Ivrea, Italy

[73] Assignee: Ing. C. Olivetti & C., S.p.A., Ivrea (Torino), Italy

[22] Filed: Sept. 29, 1971

[21] Appl. No.: 184,678

[30] Foreign Application Priority Data
Sept. 30, 1970 Italy .............................. 70263 A/70
Aug. 26, 1971 Italy .............................. 69844 A/71

[52] U.S. Cl............. 235/151.11, 318/571, 318/594, 318/601, 235/177
[51] Int. Cl........................................... G06f 15/46
[58] Field of Search.................. 235/151.11, 151.32, 235/92 MP; 318/569, 571, 574, 592, 594, 600–601

[56] References Cited
UNITED STATES PATENTS

| | | | |
|---|---|---|---|
| 3,668,500 | 6/1972 | Kosem | 318/594 X |
| 3,644,813 | 2/1972 | Schoendorff | 318/569 X |
| 3,308,360 | 3/1967 | Vanderbilt | 318/592 |
| 3,609,320 | 9/1971 | Tripp | 235/151.11 |
| 3,344,260 | 9/1967 | Lukens | 318/571 X |
| 3,513,371 | 5/1970 | Hoppe | 318/594 |
| 3,584,203 | 6/1971 | Patzelt et al. | 318/601 X |

*Primary Examiner*—Eugene G. Botz
*Assistant Examiner*—Jerry Smith
*Attorney*—Birch, Swindler, McKie & Beckett

[57] ABSTRACT

A dimension comparator for machine tools is disclosed wherein a first comparator compares a theoretical numerical dimension with an actual dimension as determined by a position measurer. After it is determined that the actual dimension is greater or less than the theoretical dimension, a second comparator compares the actual dimension to a numerical value representing the theoretical dimension plus or minus the numerical value of an aiming interval. This representative numerical value is determined by an adder controlled by the output of the first comparator. In an alternative embodiment, means are provided for controlling the adder to add predetermined increments to the theoretical dimension for comparison in the second comparator.

17 Claims, 11 Drawing Figures

INVENTORS
PIERO POMELLA
LUCIANO LAURO

DIMENSION COMPARATOR FOR MACHINE TOOLS

BACKGROUND OF THE INVENTION

The present invention relates to a dimension comparator for machine tools in which an actual dimension is compared with a theoretical dimension entered in a first register and with at least one aiming interval for said theoretical dimension.

In comparators of the aforesaid type the comparison between the analogue values of the actual dimension which are supplied by a position measurer and the entered dimension is effected by assessing the difference between the two values by means of circuits adapted to provide only an indication of equality of the two values. Another circuit makes the comparison between the same actual dimension and an aiming dimension entered with reference to a predetermined zero dimension. It therefore becomes necessary to enter the aiming dimension every time for each theoretical dimension, while the comparison circuits must be prearranged on the basis of this zero dimension, as a result of which these comparators become complicated to operate.

SUMMARY OF THE INVENTION

The technical problem that the invention proposes to solve consists in allowing the entering of successive dimensions with reference to any predetermined dimension, whereby an aiming point or dimension with respect to different dimensions need be entered only once in a given register.

This technical problem is alleviated or solved by the comparator constructed according to the invention, which is characterized by a first numerical comparison circuit for comparing the numerical value of said actual dimension with the numerical value of said theoretical dimension and a second numerical comparison circuit for comparing the numerical value of said actual dimension with the sum or the difference of the numerical values of said theoretical dimension and said aiming interval which is entered in a second register, whereby said aiming interval can be entered as an absolute value independently of said theoretical dimension.

BRIEF DESCRIPTION OF THE DRAWING

This characteristic and other characteristics of the invention will become clear from the following description of a preferred embodiment given by way of example and without restriction with reference to the accompanying drawing, in which.

DETAILED DESCRIPTION OF THE PREFERRED EMBODIMENTS

The comparator is used for controlling, for example, the feed stroke of a tool of a machine tool. In particular, the comparator can be used for controlling the feed of a tool which is to work on a workpiece or part in continuous rotation, during which the feed is effected at a high speed for approach of the workpiece up to a predetermined aiming dimension and at a working speed for passing from the aiming dimension to the desired dimension. The actual tool position is measured by a position measurer, for example of the type described in the applicants' British Pat. No. 1,120,413, which supplies the comparator with the numerical value of the dimension to be compared with the desired numerical value. The introduction of the numerical value of the dimension to be compared may, however, be effected by means of numerical registers of any type known per se, provided that at each express numerical value they supply a signal which can be used by the comparator.

Figure 1:
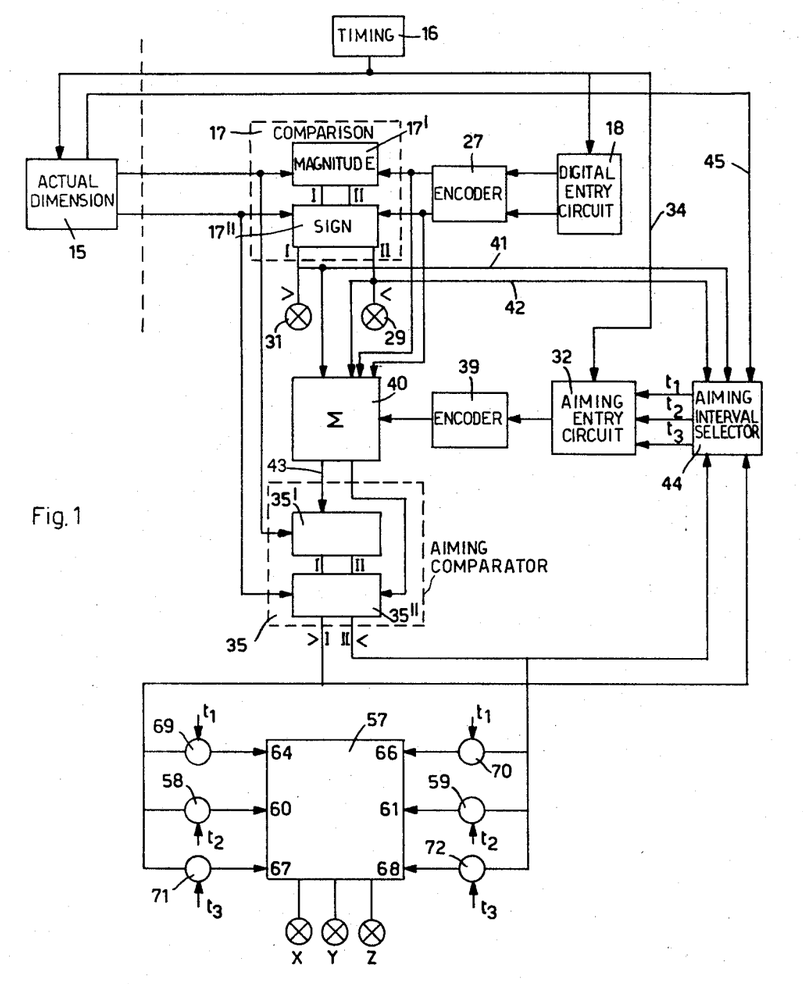
FIG. 1 is a block diagram of the dimension comparator according to the invention.

The position measurer according to the aforesaid British Patent supplies cyclically in binary decimal code, with a period of 100 $\mu$sec. the numerical values of the measurement effected, by means of a numerical counter known per se. At the end of each measuring cycle, the numerical values of the measurement effected are stored in a register 15 and are replaced from time to time by the numerical values corresponding to the following measuring cycle.

The numerical value of the position measurer may have up to six decimal digits, this being the capacity of the register 15, to which there is added the algebraic sign of the measurement.

The end of each measuring cycle hereinafter indicated as M is evidenced by the position measurer by means of a pulse which commands the transfer of the numerical value stored in the register 15 to the comparison circuit 17 in the following manner. The pulse signifying the end of the measuring cycle acts on a timing circuit 16 known per se, which causes the sending in sequence of the digits in the register 15 to a first comparison circuit 17, starting from the least significant digit, in a time less than the measuring cycle. The timing circuit 16 has as many outputs as there are digits constituting the numerical information of the position measurer and activates the corresponding outputs of the register 15 in sequence.

The entering in the comparator of the numerical value of the theoretical dimension indicated hereinafter as F and of its algebraic sign to be compared with the numerical value M supplied by the position measurer is obtained by means of a digital entering circuit 18. The entering circuit 18 (FIG. 2) is of the decimal type and comprises a system of 12 bars 18' connected in parallel through resistors R and all at the same voltage. The entering of the numerical values F and of the algebraic sign is obtained by means of a contact 19 slidable transversely of the bars and positionable manually on the bar 18' corresponding to the digit entered, for example by means of a numbered wheel. The capacity of the entering circuit 18 is six decimal digits plus the sign and corresponds to the capacity of the position measurer.

Figure 2:
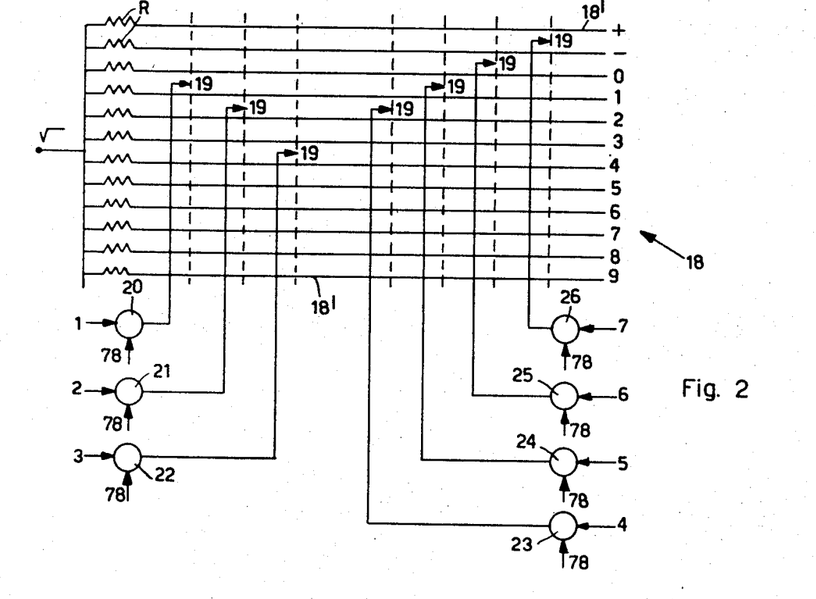
FIG. 2 shows a numerical value entering circuit of the dimension comparator.

The system of bars 18' is common to five different entering circuits 18 for numerical values $F$ to be compared with the numerical value $M$ supplied by the position measurer. Each of the five entering circuits 18 is set by means of a corresponding series of numbered wheels indicated in FIG. 6 by the references 78', 79, 80, 81 and 82. The entering circuits 18 are selected by means of a five-position external switch 83, which in each position enters in known manner the group of digits corresponding to the value set or entered on the corresponding series of wheels. FIG. 2 shows only the first entering circuit 18 corresponding to the wheel 78', which is enabled by means of the activation of a corresponding contact not shown in the drawing. This contact generates a signal 78' which is applied to a series of AND gates 20, 21, 22, 23, 24, 25 and 26.

The digits constituting the numerical value $F$ set for comparison in one of the groups of wheels 78' to 82 (FIG. 6) are selected by positioning the external switch 83 correspondingly. They are then introduced into the comparison circuit 17 (FIG. 1) by means of the timing circuit 16, which enables in sequence the gates 20, 21, 22, 23, 24, 25, 26 so as to vary in the same succession the voltage level of the bars 18'(FIG. 2) starting from the bar 18'corresponding to the least significant digit. In this way there is obtained the transfer in the desired sequence of the digits and the sign of the selected numerical value $F$ to an encoder 27, the operation of which is known per se. Encoder 27 encodes the digits entered from the decimal system into the binary decimal system and supplies to the comparison circuit 17 in sequence the digits constituting the selected numerical value $F$ for comparison in the binary decimal code in synchronism with the digits constituting the numerical value $M$ supplied by the register 15 of the position measurer.

The comparison circuit 17 comprises a first part 17' adapted to effect first of all a comparison of the two absolute values $M$ and $F$ digit by digit in a manner known per se. The part 17' is adapted to give a signal at a first output I if $|M|>|F|$ and a signal at a second output II if $M<F$. The outputs I and II are therefore associated with the register 15 and the entering circuit 18, respectively. The circuit 17 moreover comprises a second part 17'' connected to the two outputs of the part 17' and adapted to effect a comparison of the algebraic signs. The part 17'' is provided with two outputs I and II corresponding to the outputs I and II of the part 17' and respectively indicating $M>F$ and $M<F$. If the algebraic signs are both positive, the part 17'' generates a signal at the output corresponding to the output energized in the part 17'; if the signs are both negative the part 17'' generates a signal at the output opposite to the output energized in the part 17'. Finally, if the two signs are different, that output of the part 17'' which is associated with the value to which the positive sign corresponds is always energized. The signal resulting from the comparison may be utilized in any manner whatsoever, for example to provide a light indication. Therefore, if the result of the comparison is such that the value $M$ supplied by the register 15 of the position measurer is smaller than the value $F$ supplied by the entering circuit 18, the output II of the part 17'' causes the lamp 29 to light up; in the opposite case, the output I causes the lamp 31 to light up.

The arrangement according to the invention comprises a second comparison circuit 35 similar to the circuit 17 and adapted to compare the numerical value $M$ supplied by the register 15 of the position measurer with numerical values indicating a series of aiming dimensions. These numerical values are generally intermediate between the value $M$ supplied by the measurer and the numerical value $F$ previously entered and therefore represent significant points relating to the predetermined theoretical dimension.

Figure 7:
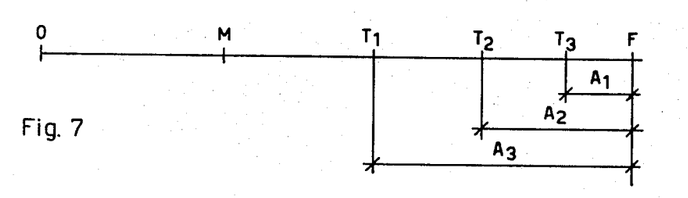
FIG. 7 is a first diagram of the dimensions to be compared in the comparator.

To this end, a numerical value corresponding to the aiming interval between the numerical value $F$ set or entered and one of the numerical values of the aiming dimensions is stored in a second entering circuit 32, so that this interval can be entered once only for all the theoretical dimensions $F$ of the entering circuits 18. Referring to FIG. 7, starting from a zero dimension representing the origin of the numerical values $M$ supplied by the position measurer, there are indicated the value $M$ supplied by said measurer and the value $F$ fixed in the entering circuit 18. Moreover, the references $T1$, $T2$, $T3$ indicate the dimensions of the three aiming points and the references $A_1$, $A_2$, $A_3$ indicate the three numerical values corresponding to three different aiming intervals, which can be stored in sequence in the second entering circuit 32.

Figure 6:
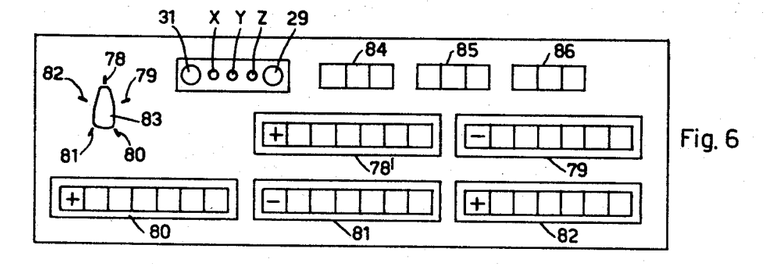
FIG. 6 is a diagram of the control panel of the comparator.

The values $A_1$, $A_2$, $A_3$ are always positive and are set in a second group of three entering circuits 32 (FIG. 3) operating in a similar manner to the entering circuits 18. The entering circuits 32 comprise another system of ten bars 32' connected in parallel by means of resistors R' and all at the same voltage. The setting of the numerical values is obtained for each digit by means of a contact 33 slidable transversely of the bars 32' and positionable manually on the bar 32' corresponding to the digit that is set through the medium of a corresponding numbered wheel. In the embodiment described, there are three digits constituting the numerical value set for each aiming interval. The three numerical values $A1$, $A2$, $A3$ are set by means of three groups of wheels 84, 85, 86 (FIG. 6). The values $A1$, $A2$, $A3$ are selected by three signals $t1$, $t2$, $t3$, respectively. generated by a suitable circuit 44 (FIG. 1), the actuation of which will become clearer hereinafter.

Figure 3:
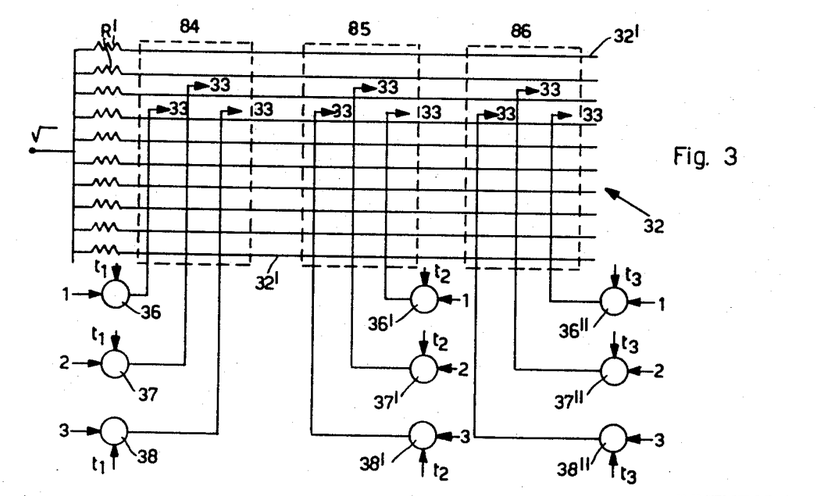
FIG. 3 shows a group of numerical aiming value entering circuits of the comparator.

The transfer of the group of digits which corresponds to a set aiming value is controlled in sequence by the timing circuit 16 under the control of the circuit 44. When the circuit 44 enables for transfer the group of digits corresponding to the value $A1$ of the aiming dimension $T_1$ set, it generates the signal $t_1$ which energizes one input of each of the gates 36, 37, 38 (FIG. 3). The timing circuit 16, in turn, energizes in sequence another input of the gates 36, 37, 38, causing the voltage level of the bar 32' corresponding to the digit selected to vary and effecting the transfer in sequence of the digits constituting the numerical value of the aiming interval A1. The transfer of the value A2 is effected in a similar manner through the medium of three gates 36', 37', 38' and under the control of the signal $t2$, while the transfer of the value $A3$ is effected through the medium of three gates 36'', 37'' and 38'' under the control of the signal $t3$.

Figure 8:
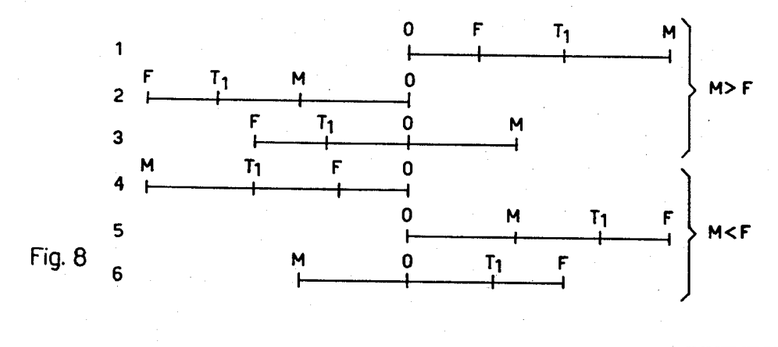
FIG. 8 is another diagram of various cases of dimensions to be compared in the comparator.

The numerical aiming value is thus transferred to an encoder 39 operating in a manner known per se, which encodes it from the decimal system into the binary decimal system and which supplies the digits encoded in this way in sequence to an adder 40 known per se. Adder 40 is adapted to effect the sum of or the difference between the numerical value $F$ previously entered and the numerical value $A1, A2, A3$ of the selected aiming interval. In fact, referring to FIG. 8, to be able to make a comparison between the numerical value $M$ and, for example, the value $T_1$, referred to the same origin O, the operation of forming the sum of or the difference between the numerical value $F$ and the numerical value $A1$ becomes necessary. In particular, since the reference zero from which the numerical measurement values are counted is arbitrary, various situations relating to the values considered may be obtained. Since these situations occur in consequence of the relative position of the numerical value $M$ with respect to the numerical value $F$, the operation which the adder 40 must carry out is dependent on the result of the comparison made by the comparison circuit 17. If the result of this comparison is such that the value $M$ is greater than the value $F$, the channel 41 (FIG. 1) connected to the output I of the sign comparator 17" is activated and presets the adder 40 for the adding operation. If, on the other hand, the numerical value $M$ (FIG. 8) is smaller than $F$, the channel 42 (FIG. 1) connected to the output II of the sign comparator 17" is activated and presets the adder 40 for the subtraction operation.

The algebraic sign of the result is established in known manner by means of the storage of the absence or presence of a carry to the higher order. If, in fact, such carry does not exist, the sign of the difference is equal to that of the minuend; if, on the other hand, such carry does exist, the sign of the difference is the opposite of that of the minuend. In conclusion, the adder 40 provides sequentially, at the output 43, the result of the operation effected in value and sign, that is in the same form as the numerical value is supplied by the register 15 of the position measurer.

The comparison circuit 35 comprises a first part 35' which effects the comparison of the two absolute values in the sequence of digits which is determined by the timing circuit 16, and a second part 35" which effects the comparison of the algebraic signs under the control of the result of the comparison made by the part 35'. The part 35' supplies at an output I a signal indicating that $M$ is greater than the value of the aiming dimension or at another output II a signal indicating that $M$ is smaller than the value of the aiming dimension.

Figure 4:
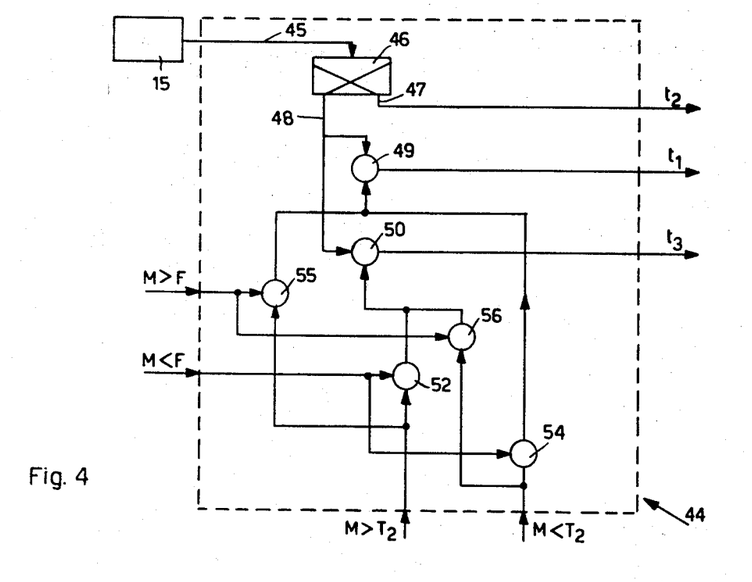
FIG. 4 is a diagram of a control circuit of the comparator.

The operations of comparison between the numerical value supplied by the register 15 of the position measurer and the numerical values of the aiming dimensions entered are effected in accordance with a sequence furnished by the control circuit 44. Referring to FIG. 4, the pulse sent every 100 $\mu$sec. by the register 15 of the position measurer and signifying the end of a measuring cycle activates through a channel 45 a flip-flop 46 which, in turn, activates the outputs 47 and 48 alternately. The output 47 activated at a first pulse from register 15 generates the signal $t2$, which enables the entering circuit to transfer the numerical value corresponding to the intermediate aiming interval $A2$ fixed by means of the wheels 84. During the corresponding measuring cycle, a comparison is therefore made between the numerical value $M$ supplied by the register 15 of the position measurer and the numerical value $F \pm A2$ corresponding to the intermediate aiming dimension $T2$.

During the following measuring cycle, on the other hand, the output 48 which is connected to two AND gates 49 and 50 is activated. The enabling of one of the two gates 49 and 50 is consequent upon the comparison effected by the circuit 17 during the preceding cycle between the value $M$ supplied by the position measurer and the set value $F$, on the one hand, and the comparison made in the same cycle by the circuit 35 between said same value $M$ and the value $F \pm A2$ corresponding to the aiming dimension or aim $T2$, on the other hand, which will hereinafter be called the value $T2$.

Figure 9:
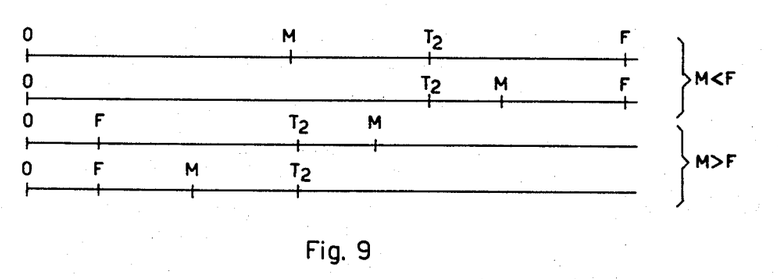
FIG. 9 is a third diagram of various cases of dimensions to be compared in the comparator.

FIG. 9 shows these comparison results synthetically and these results may be divided into two groups: one group including $M<F$ as the result of the comparison effected in the comparison circuit 17 and the two cases of $M>T2$ and $M<T2$ as a result of the comparison effected in the comparison circuit 35; and a second group including $M>F$ and the two cases of $M>T2$ and $M<T2$, respectively.

In the case of $M<F$ and $M<T2$, there are activated the output II of the circuit 17 and the output II of the circuit 35, respectively. The two signals then enable a gate 54 and, consequently, the gate 49, which generates the signal $T1$ and causes, in turn, during the cycle following that in which the comparisons described have been effected the introduction into the comparison circuit 35 of the value corresponding to the aiming dimension $T1$.

On the other hand, in the case of $M<F$ and $M>T2$, there are activated the output II of the circuit 17 and the output I of the circuit 35, respectively, which enables a gate 52 and, consequently, the gate 50, which generates the signal $t3$ and causes in turn during the following cycle the introduction into the comparison circuit 35 of the value corresponding to the aiming dimension $T3$.

In the case of $M>F$ and $M>T2$, there are activated the output I of the circuit 17 and the output I of the circuit 35, respectively. The two signals then enable the gate 55 and, consequently, the gate 49, which generates the signal $t1$ and causes in turn the comparison with the value corresponding to the aiming dimension $T1$.

Finally, in the case of $M>F$ and $M<T2$, there are activated the output I of the comparison circuit 17 and the output II of the circuit 35, respectively. Thus, a gate 56 is enabled and, consequently, the gate 50, which generates the signal $t3$ and causes in turn the comparison with the value corresponding to the aiming dimension $T3$. Obviously, in the cycles in which the output 47 of the flip-flop 46 is activated, the gates 49 and 50 are inhibited, as a result of which the result of the comparison effected in the circuit 35 (FIG. 1) with $T1$ or $T2$ does not have any effect on the circuit 44.

It is therefore clear that the position of the reference zero does not intervene in the operating logic of the circuit 44, but rather only the relations of inequality between the values $M$ and $F$ and $M$ and $T$, respectively. It is moreover clear that during the odd measuring cycles of the position measurer comparison is always enabled with the value corresponding to the aiming dimension $T2$, while during the even measuring cycles comparison is enabled either with the value corresponding to the aiming dimension $T3$ or with the value corresponding to the aiming dimension $T1$, in dependence upon the result obtained following upon the comparisons corresponding to the odd cycles. Finally, it is clear that by using a single comparison circuit three different comparisons can be effected with the sole limitation of obtaining a comparison every two measuring cycles of the position measurer. It is to be noted that the comparison cycle timed by the timing circuit 16 has a frequency equal to that of the cycle of the position measurer, so that while the final dimension $F$ is compared at each cycle, the aiming dimensions are compared at alternate cycles with the possiblity of passage through an aiming dimension between one comparison and another. If it is a question of aiming dimensions which in general are fixed for effecting preparatory operations, for example the passage from a rapid feed speed to one of slow working feed, this passage does not have any negative effect.

Figure 10:
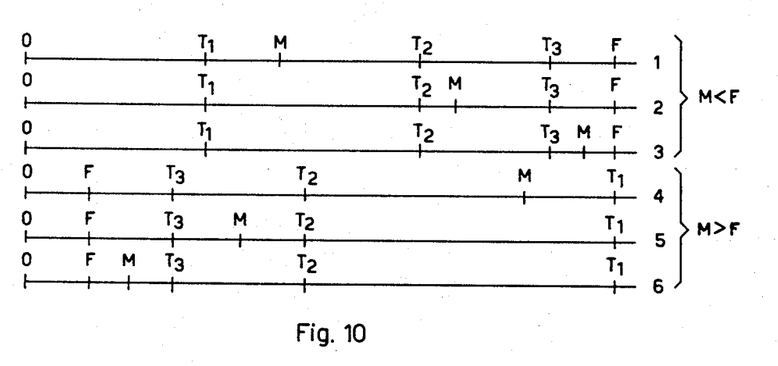
FIG. 10 is a further diagram of other cases of dimensions to be compared in the comparator.

The results of the comparisons at the end of every two cycles are shown in FIG. 10. These results may be used to control parts of the machine and are evidenced, for example, by lighting pilot lamps X, Y, Z associated with the three aiming dimensions $T1$, $T2$ or $T3$ so that the operator knows the position of the value supplied by the position measurer with respect to the value fixed by the entering circuit 18. To this end, the comparator comprises a circuit 57 (FIG. 5) which presets the lighting of the lamps X, Y, Z every time the numerical value $M$ of the measured dimension exceeds the value of the corresponding aiming dimension. When the circuit 44 generates the signal $t2$, this is applied simultaneously to two gates 58 and 59 (FIG. 1) connected to two inputs 60 and 61 of the circuit 57.

The inputs 60 and 61 are activated when the result of the comparison is $M>T2$ and $M<T2$, respectively. The result of this comparison is stored for the entire duration of the cycle in a flip-flop 62 connected to the inputs 60 and 61 (FIG. 5) and which gives a signal I when the input 61 is activated and a signal II when the input 60 is activated.

Figure 5:
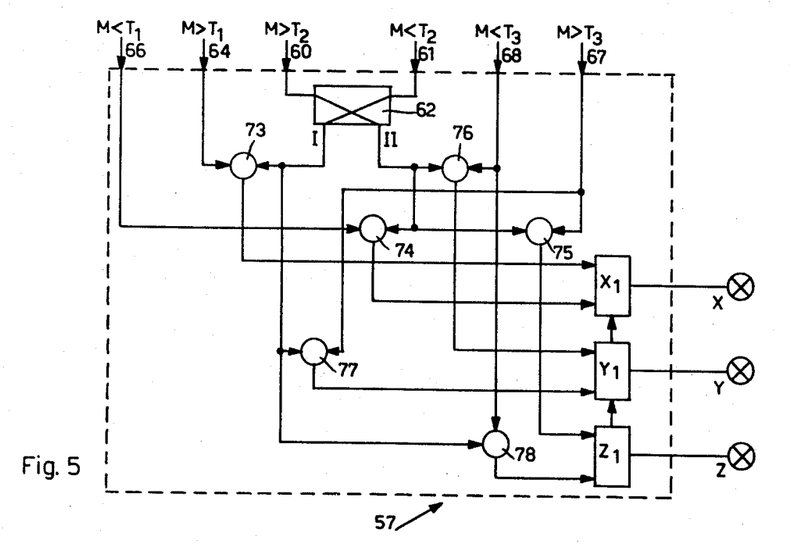
FIG. 5 is a diagram of another control circuit of the comparator.

The circuit 57 is moreover provided with another two pairs of inputs 64, 66 and 67, 68. The inputs 64 and 66 are connected to two AND gates 69 and 70 activated by the signal $t_1$, while the two inputs 67 and 68 are connected to another two AND gates 71 and 72 activated by the signal $t_3$. In FIG. 10 there are indicated the results which can be obtained in six different cases, considering the values of M and F as positive. These results are, however, independent of the position of the reference zero to which the numerical values are referred.

Let it first be assumed that we have $M<F$. If, during the comparison cycle following the cycle in which the input 61 (FIG. 5) has been activated, the result of the comparison with $T1$ is such that the gate 69 has been activated and, therefore, the input 64 of the circuit 57, we have the situation of case 1 of FIG. 10. In coincidence with the signal I of the flip-flop 62, there is now activated the gate 73 (FIG. 5) which, through a circuit $X_1$, commands the lighting of the lamp X indicating that the aiming dimension $T_1$ has been exeeded.

If, on the other hand, the input 60 has been activated and the result of the comparison with $T3$ is such that the gate 72 has been activated and, therefore, the input 68 of the circuit 57, we have the situation of the second case of FIG. 10. In coincidence with the signal II of the flip-flop 62 (FIG. 5), the gate 76 is now activated. This activates a circuit $Y_1$, which on the one hand commands the lighting of the lamp Y and on the other hand activates the circuit $X_1$ commanding at the same time the lighting of the lamp X. The light of the two lamps X and Y indicates the passing of the aiming dimension $T_2$.

Finally, if, during the comparison cycle following the cycle in which the input 60 has been activated, the result of the comparison with $T_3$ is such that the gate 71 has been activated and, therefore, the input 67 of the circuit 57, we have the situation of case 3 of FIG. 10 and the gate 75 (FIG. 5) is activated and activates the circuit $Z_1$ which commands the lighting of the lamp Z. The circuit $Z_1$, in turn, activates the circuit $Y_1$, as a result of which the lamps X and Y also light up at the same time, indicating the passing of the aiming dimension $T_3$.

Let it now be assumed that we have $M>F$. If, during the comparison cycle following the cycle in which the input 60 has been activated, the result of the comparison with $T_1$ is such that the gate 70 has been activated and, therefore, the input 66 of the circuit 57, we have the situation of case 4 (FIG. 10). The gate 74 (FIG. 5) is therefore activated and commands the lighting of the lamp X indicating the passing of the aiming dimension $T_1$.

If, on the other hand, the input 61 has been activated and the result is such that the gate 71 has been activated and, therefore, the input 67 of the circuit 57, we have the situation of case 5 (FIG. 10) and the gate 77 (FIG. 5) is activated and commands at the same time the lighting of the lamps X, Y, indicating the passing of the aiming dimension $T_2$.

Finally, if the input 61 has been activated and the result is such that the gate 72 has been activated and, therefore, the input 68 of the circuit 57, we have the situation of case 6 (FIG. 10) and the gate 78 is activated and simultaneously commands the lighting of the lamps X, Y, Z, indicating the passing of the aiming dimension $T_3$. In this way, the operator therefore has at every instant a light or luminous reference concerning the position of the value $M$ supplied by the position measurer with respect to the fixed value $F$.

Obviously, when equality is obtained in the comparison circuit 35, there is an absence of signals both at the output I and at the output II and the three lamps X, Y, Z are momentarily extinguished. This, however, has no effect, since immediately afterwards this equality is nullified. On the other hand, if there is equality in the comparison circuit 17, an absence of signals is caused at the two outputs I and II, as a result of which, on the one hand, neither of the lamps 29 and 31 is lit and, on the other hand, the feed of the tool is stopped in known manner.

Naturally, the results of the comparison between the value $M$ and the aiming values $T1$, $T2$ and $T3$ are manifested every two cycles of the position measurer inasmuch as a counting cycle is used for comparing said value $M$ with the value $T2$ and, on the basis of the result of said comparison, the following cycle is used for comparing the value $M$ with the aiming value $T1$ or $T3$. This limitation, however, is wholly acceptable inasmuch as the period of each measuring cycle of the position measurer lasts 100 $\mu$sec. In fact, since the signals issuing from the compartor of FIG. 1 are utilized in general by the measurer for effecting mechanical commands, for example for varying the feed rate of the tool of a machine, a change in these commands is never required in so small a period.

From the description given, it is obvious how the position of the reference zero of the position measurer is of no consequence for the operation of the comparator, inasmuch as this effects the comparison of the values entered taking as the origin of said values the same origin as is supplied by the position measurer.

According to another embodiment of the dimension comparator according to the invention, the numerical values of the theoretical dimensions may be entered by means of a punched tape. More precisely, the dimension comparator includes a punched-tape reader 100 (FIG. 11) the outputs 101 of which are connected through a pair of gate circuits 103 to the outputs of the encoder 27, which is similar to the encoder 27 of FIG. 1. The outputs of the encoder 27 are in turn connected to the comparison circuit 17 through a pair of gate circuits 104. The gate circuits 103 are activated by a signal LN generated on the pressing of a corresponding tape-reading push button on the control panel, which is not shown in the drawings. The gate circuits 104, on the other hand, are activated by the signal $\overline{LN}$ negated by the signal LN.

Figure 11:
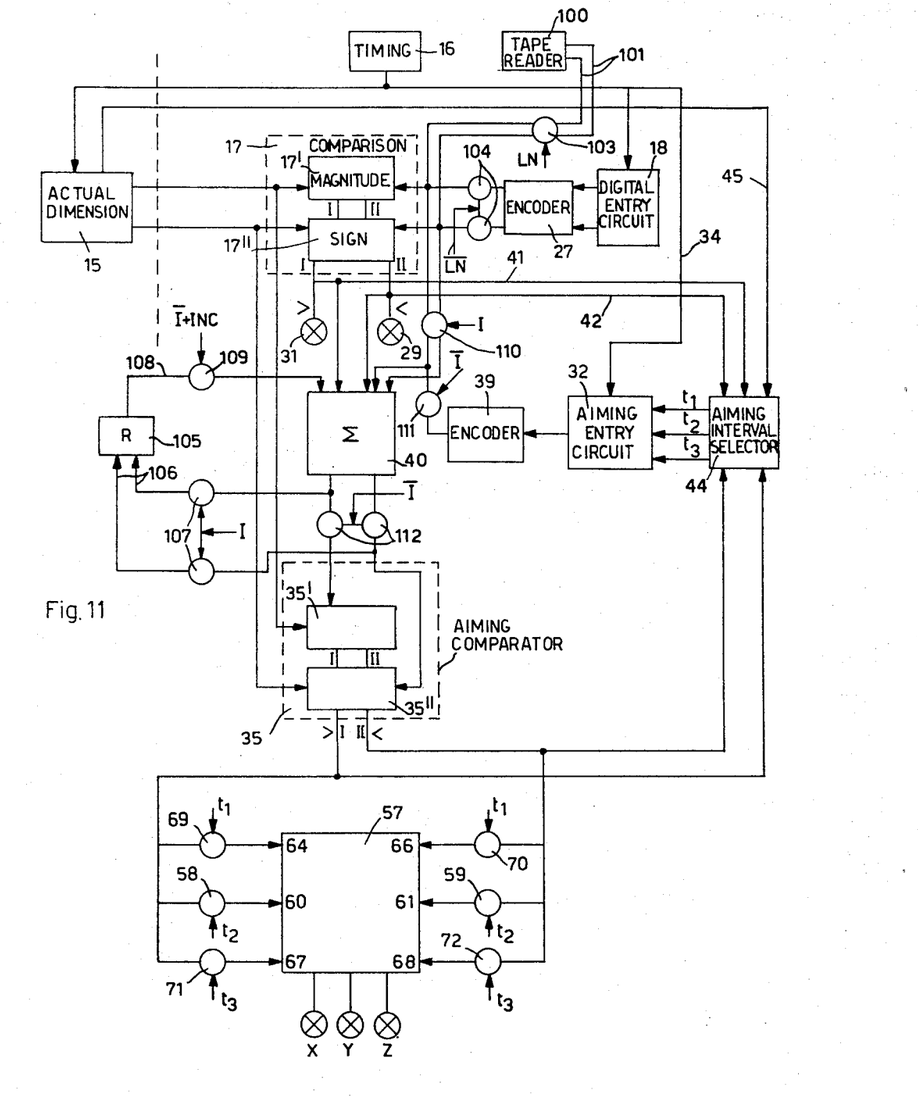
FIG. 11 is a block diagram of another embodiment of a comparator constructed according to this invention.

When it is desired to enter the data through the tape reader 100, the tape-reading push button is pressed. In this way, the signal LN is generated in known manner and simultaneously opens the gate circuits 103 and closes the gate circuits 104. In this way, the data read by the reader 100 is introduced into the comparison circuit 17. The subsequent operation of the dimension comparator is as described hereinbefore with reference to FIG. 1.

In the embodiment of the dimension comparator of FIG. 11, the movement of the tool with respect to the workpiece may also be obtained in an incremental manner instead of a continuous one. This is particularly useful in lathes, in which it is preferable to reduce the diameter of a workpiece in incremental fashion by fixed quantities, that is by given depths of cut. This movement is also very useful in drilling machines in the case where it is desired to obtain equidistant holes in a part or workpiece.

More particularly, the dimension comparator includes another register 105, the inputs 106 of which are connected through output gate circuits 107 to the outputs of the adder 40. The outputs 108 of the register 105, on the other hand, are connected through an input gate circuit 109 to the input of the adder 40. The data entering the adder 40 and coming from the tape reader 100, or from the encoder 27, pass through an input gate circuit 110, while the entering data coming from the encoder 39 pass through another input gate circuit 111. The outputs of the adder 40 are connected in their turn to the comparison circuit 35 through gate circuits 112.

The gate circuits 107 are activated by a signal I generated by a key called the "Introduction" key on the control panel, which is not shown in the drawings. The gate circuit 109, on the other hand, is activated by a signal "$\overline{I \cdot INC}$" in which the signal "INC" is a signal generated by a key, called the "Increment" key, on the control panel. The gate circuit 110 is activated by a signal $I + \overline{INC}$, while the gate circuits 111 and 112 are activated by the signal $\overline{I}$, the negation of I.

When the Introduction and Increment keys are not depressed, the corresponding signals I and INC are zero, so that the gate circuits 110, 111, 112 and 109 (FIG. 11) are open, while the gate circuit 107 is closed. The connections which are obtained under these conditions are the same, therefore, as are shown in FIG. 1, as a result of which the operation of the comparator is the same as that hereinbefore described.

On the other hand, when it is desired to select incremental operation, the Increment key is depressed and there are set on the entering circuits 32, not the aiming dimensions, but the feed increments. By then depressing the Introduction key, the theoretical dimensions set in the entering circuit 18 are introduced into the adder 40. The gate circuit 110 is thus opened, I being at 1 level. The theoretical dimensions are introduced one at a time through the adder 40 and the gate circuits 107 into the register 105 and from here, through the gate circuit 109, into the adder 40 again. This circulation of each theoretical dimension is effected for the purpose of storing the dimension in the register 105.

When the Introduction key is brought back into its inoperative position, the signal I is zero, as a result of which the gate circuits 107 are closed and the gate circuits 111 and 112 are opened. In this way, the increment set in the entering circuit 32 is introduced into the adder 40, as has been seen hereinbefore. The adder 40 adds this increment to the theoretical dimension set in the entering circuit 18 and stored in the register 105.

Moreover, since the gate circuit 110 is closed, inasmuch as the signal $I + \overline{INC}$ is zero, the theoretical dimensions set in the entering circuit 18 are not introduced into the adder 40, so that only the contents of the register 105 are present at the input of the adder 40. At this point, since the gate circuits 112 are open, the operation of the dimension comparator is the same as that described hereinbefore, with the difference that the comparison circuit 35 no longer compares the dimension M measured by the dimension measurer 15 with the sum of the theoretical dimension and the aiming dimension, but the value M with the sum of the theoretical dimension and the increment. Of course, the lighting up of the lamps X, Y, Z corresponds to this comparison.

When the comparison circuit 35 detects that the actual dimension reached during the machining is the same as that present in the adder 40, the following increment can be introduced into the latter. The Introduction key is again depressed, whereby the contents of the register 105 are introduced into the adder 40 in the manner seen hereinbefore. These contents are equal to the value of the theoretical dimension increased by the first increment and, therefore, of the actual dimension of the workpiece at that instant.

When the Introduction key is brought back into its inoperative position, a comparison is made by the comparison circuit 40 between the value M supplied by the measurer 15 and the value present in the register 105 increased by the second increment, that is the theoretical value set in the entering circuit 18 increased by two increments similarly to the preceding case. Of course, the same operations are repeated when a following increment is introduced.

It is understood that various modifications, improvements and additions or removals of parts may be made in the arrangement described without departing from the scope of the invention. For example, the comparator may be prearranged in such manner that the lamps X, Y and Z are normally lit or that the passing of the various aiming dimensions is shown by the extinction of the corresponding lamps. To this end, the circuits X1, Y1 and Z1 may act on the supply of the corresponding lamps in such manner as to open the circuit thereof instead of closing the same, or the OR gates 73 to 78 may be replaced by so-called "NAND" circuits such as to be activated by the absence of signals at their inputs.

What is claimed is:

1. A dimension comparator for machine tools for comparing an actual dimension with a theoretical dimension and at least one aiming interval for said theoretical dimenson, comprising a first register in which said theoretical dimension is entered, a first numerical comparison circuit means coupled to said first register and to means for supplying said actual dimension for comparing the numerical value of said actual dimension with the numerical value of said theoretical dimension, and for supplying a signal indicating which of said numerical values is greater, manually operable setting means for selectively setting a predetermined absolute value for said aiming interval, a second register in which said aiming interval is entered, adder means coupled to said first and second registers and responsive to the signal from said first comparison means for supplying the sum or difference of said theoretical dimension and said aiming interval, and a second numerical comparison circuit means coupled to said adder means and said actual dimension supplying means for comparing the numerical value of said actual dimension with said supplied sum or difference to detect and indicate a difference therebetween, whereby the absolute value of said aiming interval can be entered independently of said theoretical dimension.

2. A comparator as claimed in claim 1 wherein said means for supplying the algebraic numerical value of said actual dimension comprise a numerical position measurer, said first register supplying the algebraic numerical value of said theoretical dimension to said adder means, said second register supplying the absolute numerical value of said aiming interval to said adder means.

3. A comparator as claimed in claim 2, wherein said first comparison circuit means compares the algebraic values of said actual and theoretical dimensions to supply a signal indicating which of said two compared algebraic values is greater.

4. A comparator as claimed in claim 3 wherein said adder means are responsive to the signal from said first comparison circuit to supply to said second numerical comparison means the sum of the numerical values of said theoretical dimension and said aiming interval when said actual dimension is greater than said theoretical dimension and to supply to said second numerical comparison means the difference between the numerical values of said theoretical dimension and said aiming interval if said theoretical dimension is greater than said actual dimension.

5. A comparator as claimed in claim 4 including control circuit means coupled to said first and second comparison means and controlling said second register for providing from said second register to said adder means one of at least three aiming intervals, said second comparison means making said comparison between the output of said first register and the output of said adder alternately on the basis of the intermedate aiming inteval and of one of the exteme aiming intevals of said three aiming intervals.

6. A comparator as claimed in claim 5, including timing means for controlling said position measurer to cyclically determine the position of said machine tool, said timing means controlling the comparison cycle of said first and second comparison circuit means at a frequency equal to the frequency of the cycle of said position measurer.

7. A comparator as claimed in claim 6 wherein said control circuit means are responsive to the outputs of said first and second comparison circuits and said timing means for selecting the extreme aiming interval of said three aiming intervals to be compared.

8. A comparator as claimed in claim 6 including means controlled by said first and second comparison circuit means for commanding the working feed of the machine tool. the numerical 9. A dimenson comparator for machine tools for comparing an actual dimension with a theoretical dimension and at least one aiming interval for said theoretical dimension, comprising a first register in which an algebraic numerical value of said theoretical dimension is entered, a first numerical comparison circuit means coupled to said first register and to a numerical position measurer which supplies said actual dimension to said first comparison circuit for comparing the numerical value of said actual dimension with the numerical value of said theoretical dimension, and for supplying a signal indicating which of said two compared algebraic values is greater, a second register in which the absolute numeric value of said aiming interval is entered, adder means controlled by said first comparison circuit for supplying the sum of the numerical values of said theoretical dimension and said aiming interval when said actual dimension is greater than said theoretical dimension and for supplying the difference between the numerical values of said theoretical dimension and said aiming interval if said theoretical dimension is greater than said actual dimension, a second numerical comparison circuit means coupled to said adder means and said position measurer for comparing the numerical value of said actual dimension with said supplied sum or difference, means for providing to said adder means at least three aiming intervals, and for causing said focausingsaid second comparison circuit to make said comparison alternately on the basis of the intermediate aiming interval and of one of the extreme aiming intervals of said three aiming intervals.

10. A comparator as claimed in claim 9 wherein said causing means are coupled to said first and second comparison circuits, the extreme aiming interval to be compared being determined by the outputs of said first and second comparison circuits.

11. A comparator as claimed in claim 10, including timing means for controlling said position measurer to cylically determine the position of said machine tool, said timing means controlling the comparison cycle of said first and second comparison circuit means at a frequency equal to the frequency of the cycle of said position measurer.

12. A comparator as claimed in claim 11 including means controlled by said first and second comparison circuit means for commanding the working feed of the machine tool.

13. A dimension comparator for machine tools for comparing an actual dimension with a theoretical dimension and at least one aiming interval for said theoretical dimension, comprising a first register in which an algebraic numerical value of said theoretical dimension is entered, a first numerical comparison circuit means coupled to said first register and to a numerical position measurer which supplies said actual dimension for comparing the numerical value of said actual dimension with the numerical value of said theoretical dimension, and for supplying signals indicating which of said two compared algebraic values is greater, a second register in which the absolute numeric value of said aiming interval in entered, adder means controlled by said first comparison circuit for supplying the sum of the numerical values of said theoretical dimension and said aiming interval when said actual dimension is greater than said theoretical dimension and for supplying the difference between the numerical values of said theoretical dimension and said aiming interval if said theoretical dimension is greater than said actual dimension, a second numerical comparison circuit means coupled to said adder means and said position measurer for comparing the numerical value of said actual dimension with said supplied sum or said supplied difference, manually operable means for entering a numerical incremental value in said second register, connecting gate means responsive to said manually operable means for selectively connecting a third register and said first and second registers to said adder means, said third register providing a recirculation path for data from said first and second registers so that the sum of said incremental value and said theoretical dimension is provided by said adder to said second comparison circuit for comparison with said actual dimension.

14. A comparator as claimed in claim 13 wherein said connecting means include first gates connected between the output of said first register and the input of said adder means and the output of said adder means and the input of said third register for transferring the theoretical dimension in said first register to said third register, and second gates connected between the outputs of said second and third registers and the input of said adder means and the output of said adder means and the input of said second comparison circuit for conditioning said second comparison circuit to compare said actual dimension with the sum of said theoretical dimension and said incremental value.

15. A comparator as claimed in claim 13 wherein said connecting gate means are responsive to said manually operable means in a first period to connect said first register to said adder to store said theoretical dimension in said third register, and in a second period to connect said second and third registers to said adder to provide the sum of the contents of said first and second registers to said second comparison circuits.

16. A comparator as claimed in claim 15 wherein said connecting circuits are deactivated in said first period, as a result of which said sum of said theoretical value and said incremental value is transferred to said third register by said output circuit means.

17. A comparator as claimed in claim 15 wherein said connecting means include first gates connected between the output of said first register and the input of said adder means and the output of said adder means and the input of said third register for transferring the theoretical dimension in said first register to said third register, and second gates connected between the outputs of said second and third registers and the input of said adder means and the output of said adder means and the input of said second comparison circuit for conditioning said second comparison circuit to compare said actual dimension with the sum of said theoretical dimension and said incremental value.

* * * * *